H. C. Varnum.
Combined Rake & Tedder.
Nº 94,048. Patented Aug. 24, 1869.
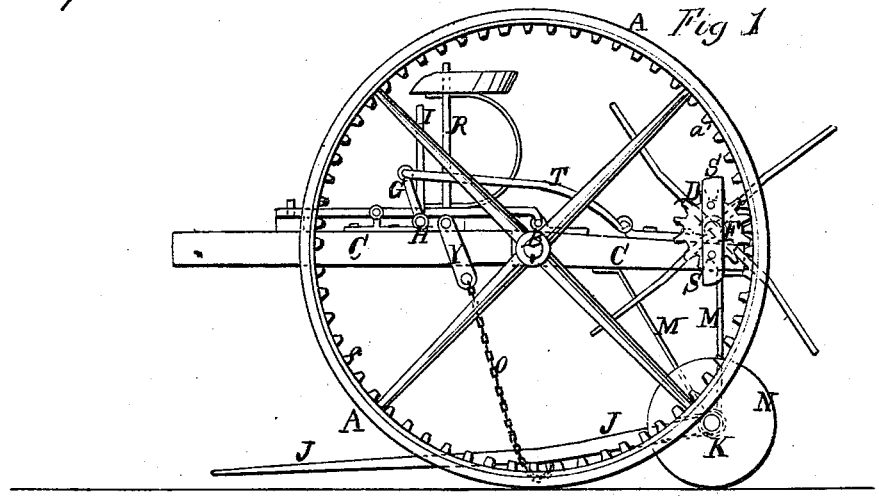
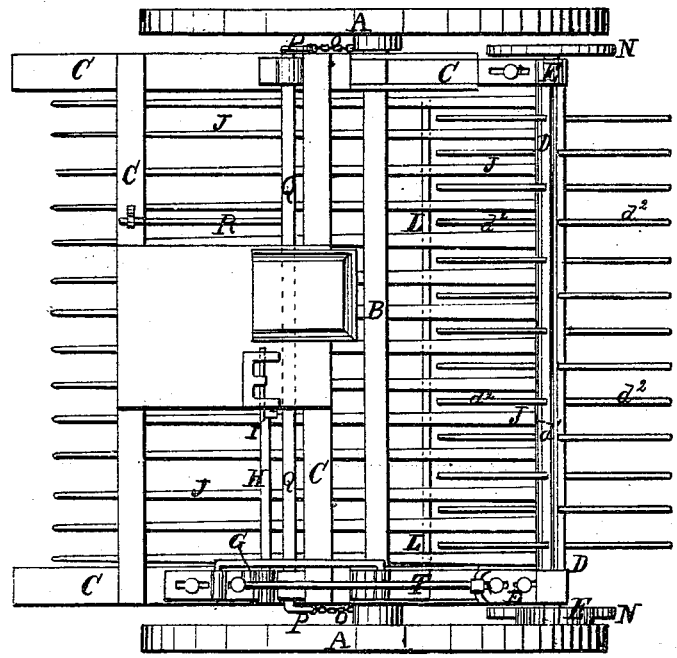
Witnesses:
A Bennerendorf
O Hirschman
Inventor:
H C Varnum
per [signature]

United States Patent Office.

HENRY C. VARNUM, OF HARTFORD, VERMONT.

Letters Patent No. 94,048, dated August 24, 1869.

IMPROVEMENT IN HORSE-RAKE AND HAY-SPREADER COMBINED.

The Schedule referred to in these Letters Patent and making part of the same.

*To all whom it may concern:*

Be it known that I, HENRY C. VARNUM, of Hartford, in the county of Windsor, and State of Vermont, have invented a new and improved Combined Hay-Rake and Spreader; and I do hereby declare that the following is a full, clear, and exact description thereof, which will enable others skilled in the art to make and use the same, reference being had to the accompanying drawing, forming part of this specification, in which—

Figure 1 is a side view of my improved machine.

Figure 2 is a top view of the same.

Similar letters of reference indicate corresponding parts.

My invention has for its object to furnish a simple and convenient machine for raking and spreading hay, which shall be so constructed and arranged that it may be readily adjusted for either use, doing its work well and thoroughly in either capacity; and It consists in the construction and combination of the various parts of the machine, as hereinafter more fully described.

A are the wheels, and

B is the axle of the machine.

C is the frame of the machine, the side-bars of which are jointed at the axle B, to enable the operating parts of the machine to adjust themselves to the surface of the ground, whether that surface be inclined or uneven.

D is the spreader, the ends of the shaft $d^1$ of which revolve in bearings E, attached to the rear ends of the jointed side-bars of the frame C, as shown in fig. 2.

$d^2$ are the teeth, which are passed through and secured to the shaft $d^1$, in rows, at right angles to each other, as shown in fig. 1.

To one end of the shaft $d^1$ of the spreader D, is attached a small gear or pinion-wheel, F, the teeth of which mesh into the teeth $a'$, formed upon or attached to the inner edge of the concave side of the rim of the drive-wheel A, so that the spreader may be revolved by the advance of the machine.

The bearings E, at one or both ends of the spreader-shaft $d^1$, are secured in place by bolts passing through slots in said bearings, so that they may be moved forward and back to throw the spreader out of and into gear with the drive-wheel, when desired.

To the sliding bearings E is pivoted the rear end of the connecting-rod T, the other end of which is pivoted to the crank-arm G, formed upon or attached to the shaft H, which works in bearings attached to the frame C, and to which is attached or upon which is formed a lever, I, extending up into such a position that it can be conveniently reached and operated by the driver, from his seat, to throw the spreader into and out of gear with the drive-wheel, when desired.

J are the rake-teeth, which are pivoted to the shaft or rod K, and which are held in their proper relative positions by the rod L, which passes through them a short distance from their rear ends.

The ends of the rod K are attached to downwardly-projecting brackets or arms M, attached to the rear parts of the jointed side-bars of the frame C.

Upon the projecting ends of the rod K revolve the small wheels N, which roll along the surface of the ground and support the rear part of the rake.

The teeth $d^2$ of the spreader are made of such a length that when the spreader is revolving, they will just clear the rear part of the rake, and so that when the spreader is moved forward to throw it out of gear with the drive-wheel, they will come in contact with and be supported by the axle B, holding the lower row of teeth in a vertical position, directly above the rear part of the rake.

O are chains, the lower ends of which are attached to the sides of the rake, and the upper ends of which are attached to the cranks P, formed upon or attached to the ends of the rod or shaft Q, which works in bearings attached to the frame C, and to which rod or shaft is also attached a lever, R, by means of which the forward part of the rake may be raised from the ground to pass over obstructions, or for convenience in passing from place to place.

When the machine is to be used for raking hay, a short cross-bar, S, is attached to the side of the small gear-wheel F, with its ends projecting so far beyond the teeth of said wheel, so that, as the spreader revolves, the ends of the said cross-bar may strike against the inner or concave surface of the drive-wheel, and push the spreader out of gear with the said drive-wheel, automatically.

In using the machine as a hay-rake, the spreader is thrown out of gear with the drive-wheel, so that the forward teeth of the spreader may strike against the axle B, holding the lower teeth of said spreader in a vertical position, so that, as the hay slides up upon the rake-teeth J, the said vertical teeth of the spreader may detain it until enough has been collected to form a section of a windrow.

The lever I is then operated, to throw the spreader D into gear with the drive-wheel A, which revolves the spreader, discharging the collected hay.

As the spreader revolves, the end of the cross-bar S strikes against the rim of the drive-wheel A, again throwing the spreader out of gear with the drive-wheel, and bringing it into position to again detain the hay.

When the machine is to be used as a spreader, the cross-bar S is removed, and the spreader is thrown into gear with the drive-wheel, so as to be constantly revolved to scatter or spread the hay as it passes over the rear part of the rake.

Having thus described my invention,

What I claim as new, and desire to secure by Letters Patent, is—

1. The revolving spreader D, in combination with the jointed side-bars of the frame C, and with the drive-wheel A, whether used with or without the rake J K L, substantially as herein shown and described, and for the purpose set forth.

2. An improved hay-rake, formed by the combination of the rake J K L, rotating spreader D, jointed side-bars of the frame C, axle B, and drive-wheels A, with each other, substantially as herein shown and described, and for the purpose set forth.

3. Jointing the side-bars of the frame C, when used in connection with the small wheels N, to adapt the machine for use upon inclined or uneven ground, substantially as herein shown and described.

4. The combination of the detachable cross-bar S, with the gear-wheel F of the spreader D, and with the drive-wheel A, substantially as herein shown and described, and for the purpose set forth.

5. The combination of the lever I, shaft H, lever or crank-arm G, connecting-rod T, and sliding bearings E, with the frame C, and shaft $d^1$ of the spreader D, substantially as herein shown and described, and for the purpose set forth.

HENRY C. VARNUM.

Witnesses:
    LUTHER PEASE,
    HENRY PEASE.